United States Patent
Miyazawa et al.

(10) Patent No.: US 8,448,086 B2
(45) Date of Patent: May 21, 2013

(54) DISPLAY APPARATUS, DISPLAY METHOD, AND PROGRAM

(75) Inventors: Yusuke Miyazawa, Tokyo (JP);
Fuminori Homma, Tokyo (JP);
Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 12/813,151

(22) Filed: Jun. 10, 2010

(65) Prior Publication Data

US 2011/0016422 A1    Jan. 20, 2011

(30) Foreign Application Priority Data

Jul. 16, 2009    (JP) ................................ P2009-167910

(51) Int. Cl.
*G06F 3/048* (2006.01)
(52) U.S. Cl.
USPC ............ 715/788; 715/863; 715/702; 715/864
(58) Field of Classification Search
USPC ................ 715/788, 863, 864, 808, 809, 702, 715/711, 715
See application file for complete search history.

(56) References Cited

U.S. PATENT DOCUMENTS

| | | | |
|---|---|---|---|
| 5,406,307 A * | 4/1995 | Hirayama et al. | 715/800 |
| 5,500,935 A * | 3/1996 | Moran et al. | 715/863 |
| 5,745,116 A * | 4/1998 | Pisutha-Arnond | 715/863 |
| 5,805,167 A * | 9/1998 | van Cruyningen | 715/808 |
| 7,477,231 B2 | 1/2009 | Asai | |
| 2003/0197744 A1* | 10/2003 | Irvine | 345/856 |
| 2005/0114788 A1* | 5/2005 | Fabritius | 715/767 |
| 2005/0125727 A1* | 6/2005 | Ramachandran | 715/520 |
| 2007/0120832 A1* | 5/2007 | Saarinen et al. | 345/173 |
| 2008/0178126 A1* | 7/2008 | Beeck et al. | 715/863 |
| 2010/0088634 A1* | 4/2010 | Tsuruta et al. | 715/800 |
| 2010/0306702 A1* | 12/2010 | Warner | 715/811 |

FOREIGN PATENT DOCUMENTS

| | | |
|---|---|---|
| JP | 2004-54589 | 2/2004 |
| JP | 2007-183787 | 7/2007 |

* cited by examiner

*Primary Examiner* — Weilun Lo
*Assistant Examiner* — Rashedul Hassan
(74) *Attorney, Agent, or Firm* — Sherr & Jiang, PLLC

(57) ABSTRACT

There is provided a display apparatus including a display capable of displaying a plurality of windows using a browser, a device such as a touch panel that detects a screen operation on the display performed by a user, a selection unit that selects a first window specified by the user according to a first screen operation detected by the device, and a screen region setting unit that sets the screen region of a second window with respect to the selected first window in an orientation of a browser, according to a second screen operation of the user following the first screen operation, detected by the device, the screen region of the second window corresponding to the second screen operation.

19 Claims, 13 Drawing Sheets

FIG. 5

| OPERATION DEVICE | SELECTING OPERATION | DISPLAY OPERATION | | | |
|---|---|---|---|---|---|
| | | TAB | DIFFERENT WINDOW | OVERWRITE | PARALLEL |
| TOUCH PANEL | PRESS | FLICK TO LEFT OR RIGHT AND RELEASE | DOUBLE TAP | RELEASE | FLICK TO UP OR DOWN AND RELEASE |
| TOUCH PANEL | LONG PRESS | FLICK TO LEFT OR RIGHT AND RELEASE | DOUBLE TAP | RELEASE | FLICK TO UP OR DOWN AND RELEASE |
| MOUSE/TOUCH PAD | PRESS | DRAG TO LEFT OR RIGHT AND RELEASE | DOUBLE CLICK | RELEASE | DRAG TO UP OR DOWN AND RELEASE |

DISPLAY APPARATUS, DISPLAY METHOD, AND PROGRAM

BACKGROUND OF THE INVENTION

1. Field of the Invention

The present invention relates to a display apparatus, a display method, and a program. More specifically, the invention relates to a display apparatus, a display method, and a program having an interface capable of displaying windows at high speed.

2. Description of the Related Art

In recent years, due to an increase in the size of a display and improvement in an image resolution, a plurality of windows may be displayed on the display. Among mobile apparatuses, a mobile apparatus in which a plurality of pages may be displayed in tab formats using a web (Web) browser or the like has become mainstream, due to an increase in memory capacity and improvement in communication speed. Under these circumstances, an operation for specifying the display position of content or a window has been frequently performed by a user in the mobile apparatus as well.

Currently, a display location of content is specified from a context menu in desk-top type computers. However, when such an operation is performed, the number of steps would be increased. Further, an operation of displaying the context menu has not been currently established yet in the mobile apparatus, and a method of displaying a window cannot be therefore specified.

Japanese Patent Application JP 2006-260541, for example, proposes a technique in which by analyzing a link of a Web page in advance, a sequence of Web pages may be browsed just by performing a scroll operation on Web content. Japanese Patent Application JP 2003-345332 proposes a technique in which, by making overlay display of a link destination on a base image so that information at the link destination is looked through, an overview of the information at the link destination may be grasped before the Web page of the link destination is opened. Further, Japanese Utility Patent JP 3135581 proposes a browser which displays an operation tool bar for a window and an operation bar for a page.

SUMMARY OF THE INVENTION

The techniques disclosed in Patent Documents 1 and 2 are not suited to use where contents are displayed in parallel on a plurality of windows when using a tab-type browser. The technique disclosed in Patent Document 3 is highly effective for a device having a sufficiently large window size. However, a lot of GUI (Graphic User Interface) buttons are disposed on a screen of a mobile apparatus, thereby encroaching a region on which a Web page is displayed. For this reason, it is difficult to use these techniques for the mobile apparatus in view of user's convenience.

On the other hand, in recent years, an apparatus including an input device such as a touch panel has been used. Such an input device can detect the position of a finger and is therefore used to implement a high-speed, sensory device operation. Thus, there is a need for opening a plurality of windows using such an input device. If the plurality of windows may be opened so as to most facilitate viewing and listening according to an intuitive screen operation by a user, an operation of the mobile apparatus is more facilitated and a desired image may be viewed at a position where the image is easy to view.

In light of the foregoing, it is desirable to provide a novel and improved display apparatus, a novel and improved display method, and a novel and improved program including an interface capable of displaying windows at high speed according to user's preference using first and second screen operations performed by a user.

In order to solve the above-mentioned problems, according to an embodiment of the present invention, there is provided a display apparatus which includes:

a display screen capable of displaying a plurality of windows, using a browser;

a device that detects a screen operation performed on the display screen by a user;

a selection unit that selects a first window specified by the user, according to a first screen operation of the user detected by the device; and a screen region setting unit that sets a screen region of a second window with respect to the selected first window in an orientation of the browser, according to a second screen operation of the user following the first screen operation, detected by the device, the screen region of the second window corresponding to the second screen operation.

With this arrangement, the first window specified by the user is selected according to the first screen operation of the user on one of the windows on the screen capable of displaying the windows using the browser so as to view and listen to contents. Next, according to the second operation of the user following the first screen operation, the screen region of the second window corresponding to the second screen operation is set with respect to the selected first window, in the orientation of the browser.

With this arrangement, the user may carry out a method of selecting a window and then displaying the window, by a sequence of operations. This allows display of one or a plurality of windows of predetermined sizes at predetermined positions at high speed and according to a preference of the user, by the sequence of operations. Especially when the display apparatus is mounted on a portable-type terminal having a small screen region, encroachment of a Web page display region is reduced, and convenience is increased. Thus, this display method is desirable.

The screen region setting unit may automatically set a predetermined screen region in the orientation of the browser as the screen region of the second window when the second screen operation of the user following the first screen operation is not detected by the device.

The second screen operation of the user may indicate a direction of the screen region in which the second window is opened with respect to the first window; and the screen region setting unit may set the screen region of the second window according to the indicated direction.

The screen region setting unit may set the position and the size of the second window as the screen region of the second window.

The display apparatus may be mounted on a portable-type terminal.

The display apparatus may further include:

a rotation angle calculation unit that calculates a rotation angle relative to the selected first window according to the second screen operation of the user following the first screen operation, detected by the device, the rotation angle corresponding to the second screen operation;

the screen region setting unit setting the screen region of the second window according to the rotation angle calculated by the rotation angle calculation unit.

The screen region setting unit may set the screen region of the second window according to a period of time in which the device contacts the display screen.

In order to solve the above-mentioned problems, according to another embodiment of the present invention, there is provided a display method including the steps of:

detecting, by a device, a screen operation on a display screen performed by a user, the display screen being capable of displaying a plurality of windows using a browser;

selecting a first window specified by the user, according to a first screen operation of the user detected by the device; and setting a screen region of a second window with respect to the selected first window in an orientation of the browser, according to a second screen operation of the user following the first screen operation, detected by the device, the screen region of the second window corresponding to the second screen operation.

In order to solve the above-mentioned problems, according to another embodiment of the problem, there is provided a program that causes a computer to execute the processes of:

detecting, by a device, a screen operation on a display screen performed by a user, the display screen being capable of displaying a plurality of windows using a browser;

selecting a first window specified by the user, according to a first screen operation of the user detected by the device; and setting a screen region of a second window with respect to the selected first window in an orientation of the browser, according to a second screen operation of the user following the first screen operation, detected by the device, the screen region of the second window corresponding to the second screen operation.

As described above, according to the present invention, windows may be displayed at high speed according to a user's preference by two stages of the screen operations by the user.

BRIEF DESCRIPTION OF THE DRAWINGS

FIG. 5 is a table showing other examples of window display that is executed by the mobile apparatus in the first embodiment;

DETAILED DESCRIPTION OF THE EMBODIMENTS

Figure 1:
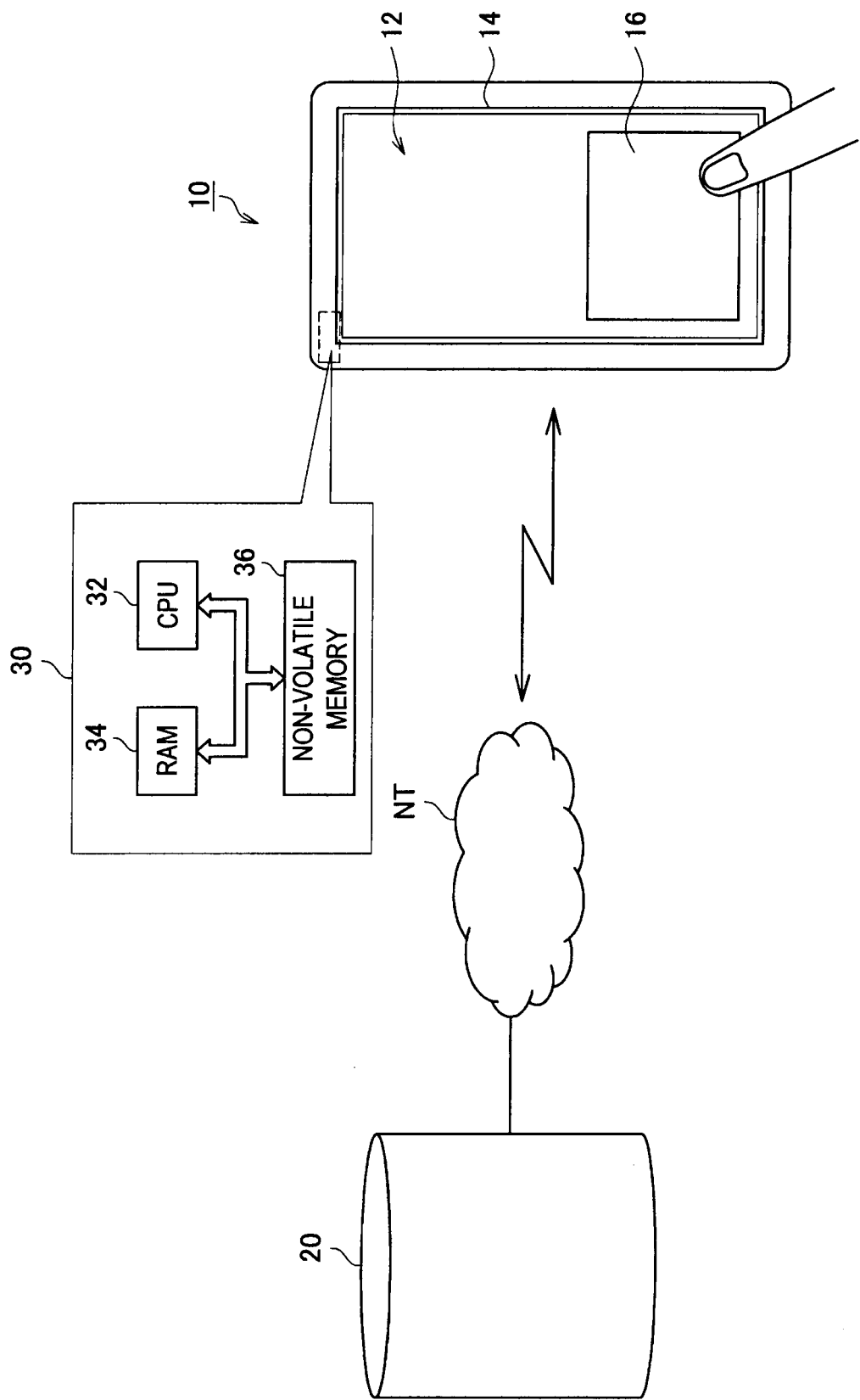
FIG. 1 is a diagram showing a mobile apparatus according to first to third embodiments.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferably, a mobile apparatus to which a display apparatus according to each embodiment of the present invention is applied is mainly a portable-type terminal such as a cellular phone, a portable music player, or a portable information terminal (PDA: Personal Digital Assistant). However, the display apparatus according to the present invention may also be used for a note-type PC (Personal Computer), a stationary-type PC, and the like.

Description will be given in the following order:
First Embodiment
 [1-1, Hardware Configuration of Mobile Apparatus]
 [1-2, Functional Configuration of Mobile Apparatus]
 [1-3, Operation of Mobile Apparatus]
Second Embodiment
 [2-1, Functional Configuration of Mobile Apparatus]
 [2-2, Operation of Mobile Apparatus]
Third Embodiment
 [3-1, Functional Configuration of Mobile Apparatus]
 [3-2, Operation of Mobile Apparatus]
<Variation Example>

First Embodiment 1-1, Hardware Configuration of Mobile Apparatus

First, a hardware configuration of the mobile apparatus according to a first embodiment will be described with reference to FIG. 1. A mobile apparatus 10 according to this embodiment is device having a transmissive touch panel on the display 12. The touch panel includes a sensor that may detect the position of an operational tool, an example of which is a finger of a user. The mobile apparatus 10 receives through a network NT various contents from a content server 20 connected to the network NT, and displays the various contents on the display 12. That is, the display 12 is a display screen capable of displaying a plurality of windows for viewing and listening to contents, using a browser.

As the display 12, a liquid crystal display (LCD: Liquid Crystal Display), an organic electro luminescence display (organic EL, OELD: Organic Electroluminescence Display), or the like may be employed.

A touch panel 14 is provided at the display 12, and detects a screen operation performed by the user. The touch panel 14 detects the position of a finger in x and y directions. More preferably, the touch panel 14 includes a function capable of detecting pushing-in on (depression of) the display 12, in addition to this detection of the position of the finger. The touch panel 14 corresponds to a device that is provided at the display 12 and detects a screen operation performed by the user.

A microprocessor 30 including a CPU 32, a RAM 34, and a non-volatile memory 36 is embedded into the mobile apparatus 10. Information on the screen operation detected by the touch panel 14 is temporarily stored in various memories. The CPU 32 controls a window display process that will be described later. The following hardware configuration may also be referred to a hardware configuration of the display apparatus mounted on the mobile apparatus.

1-2 Functional Configuration of Mobile Apparatus

Figure 2:
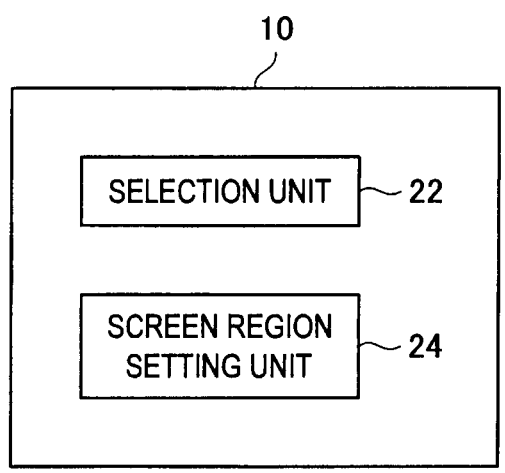
FIG. 2 is a diagram showing a functional configuration of the mobile apparatus in the first embodiment.

The mobile apparatus 10 according to the first embodiment has a functional configuration illustrated by functional blocks shown in FIG. 2. That is, the mobile apparatus 10 in this embodiment includes a selection unit 22 and a screen region setting unit 24.

The selection unit 22 selects a first window specified by the user, according to a first screen operation of the user detected by the touch panel 14. When it is detected that the user has touched (performs a first screen operation on) a predetermined screen region in the mobile apparatus in FIG. 1, for example, the selection unit 22 selects the touched screen region as a first window 16.

The screen region setting unit 24 sets the screen region of a second window with respect to the selected first window 16, according to a second operation of the user following the first screen operation, detected by the touch panel. The screen region of the second window is set, corresponding to the second screen operation. When the user moves the finger that has touched the first window 16 upward, for example, the screen region of the second window is set above the first window 16.

Information linked to a tab-type window is displayed. The user may view and listen to the information linked to the tub-type window. As the linked information, a photograph, a map, or a word, for example, may be pointed out. A Web browser that may open a plurality of pages respectively displaying a plurality of photographs is used for the tab-type window.

The screen region setting unit 24 sets the screen region of the second window corresponding to the second screen operation, with respect to the selected first window, in the orientation of the browser. When the second screen operation of the user following the first screen operation is not detected by the touch panel, the screen region setting unit 24 automatically sets the screen region of a predetermined window in the orientation of the browser.

The second screen operation of the user is an operation including a gesture indicating the screen region in which the second window is opened with respect to the first window. The screen region setting unit 24 sets the screen region of the window corresponding to the gesture of the second screen operation. The screen region setting unit 24 sets the position and the size of the second window as the screen region of the second window. This setting operation will be described later in detail.

A command to each functional configuration unit mentioned above is executed by a dedicated control device or the CPU 32 that executes a program. Programs for executing a character input process that will be described next are stored in the RAM 34 and the non-volatile memory 36 in advance. The CPU 32 reads and executes each program from these memories. Respective functions of the selection unit 22 and the screen region setting unit 24 are thereby implemented.

1-3, Operation of Mobile Apparatus

Figure 3:
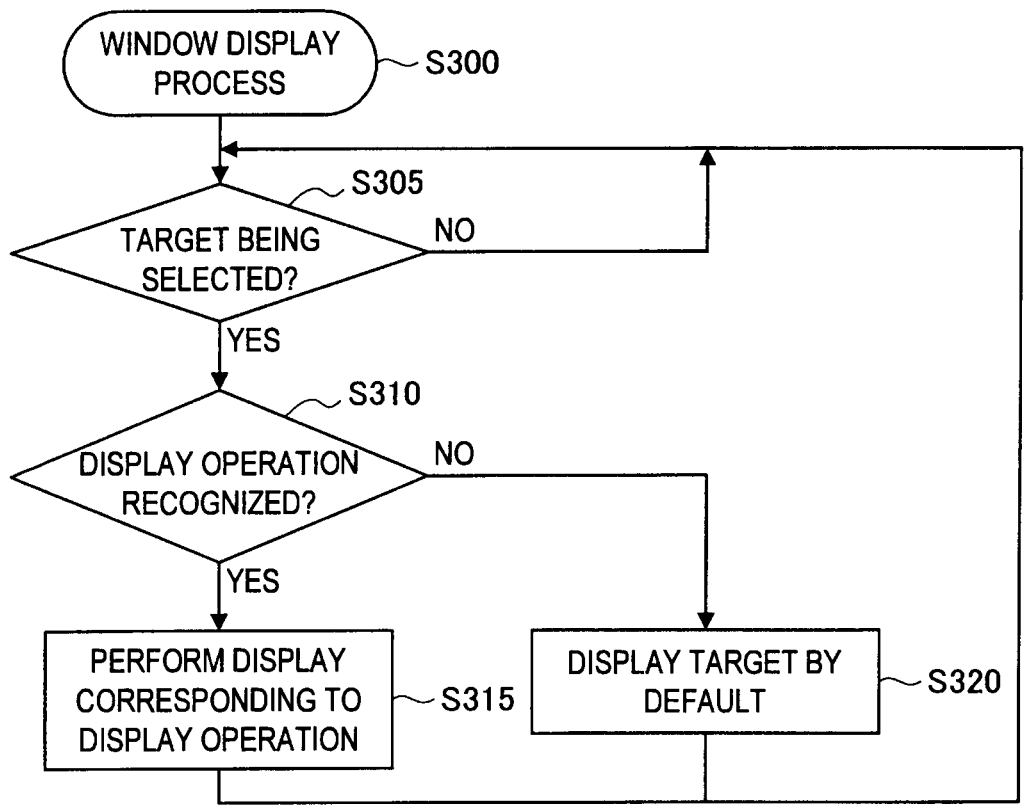
FIG. 3 is a flowchart showing a window display process that is executed by the mobile apparatus in the first embodiment.

Next, a window display process of the mobile apparatus 10 according to this embodiment will be described with reference to FIG. 3. FIG. 3 is a flowchart showing the window display process that is executed by the mobile apparatus 10 according to this embodiment. Description will be given below, taking the Web browser capable of displaying a plurality of pages in tab formats as an example. Operations that will be described below may also be regarded as operations of the display apparatus mounted on the mobile apparatus 10 according to this embodiment.

When the window display process is started in step S300, the selection unit 22 determines whether or not a target window is being selected, in step S305. In the mobile apparatus 10 shown in the upper-stage center of FIG. 4, a window 16a is shown on a lower half portion of the display 12. When the finger of the user has touched this window 16a for a certain period of time or more (which is the first screen operation), the touch panel 14 detects this touch, and selects the window 16a as the first window.

Next, when the user executes the second screen operation following the first screen operation, the second screen operation of the user is detected by the touch panel 14 in step S310. In step S315, the screen region setting unit 24 sets the screen region of the second window with respect to the selected first window according to the second screen operation of the user. The screen region setting unit 24 sets the screen region of the second window corresponding to the second screen operation, in the orientation of the browser.

Assume that the user flicks the finger to the left or right, for example. When the user flicks the finger in a left direction with respect to a current window, a link destination is displayed as a left tab. When the user flicks the finger in a right direction with respect to the current window, a link destination is displayed as a right tab. Assume that the user flicks the current window up or down. When the user flicks the finger in an upper direction with respect to the current window, a link destination is displayed on an upper portion of the screen. When the user flicks the finger in a lower direction with respect to the current window, a link destination is displayed on a lower portion of the screen.

Figure 4:
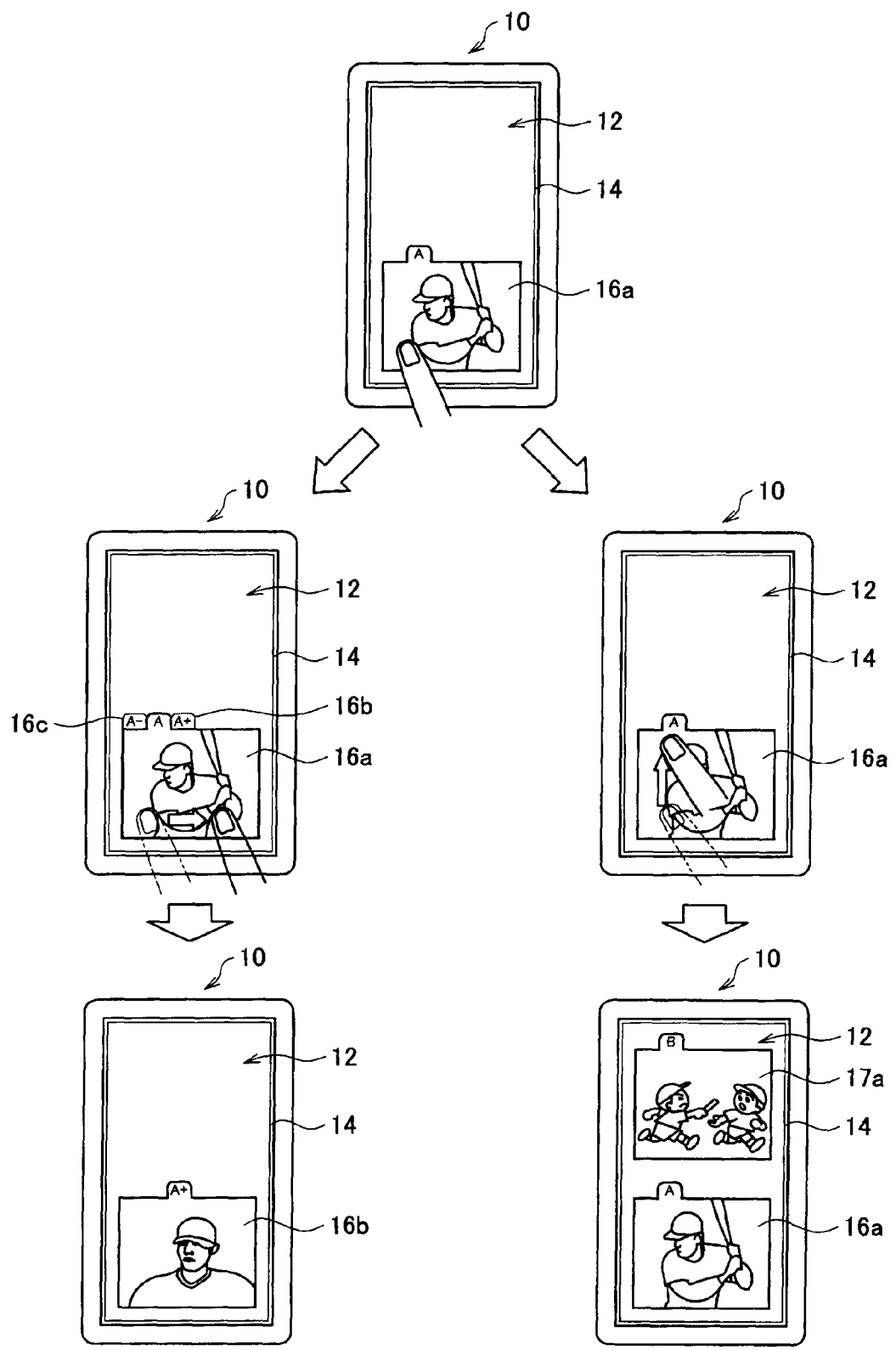
FIG. 4 includes diagrams showing examples of window display that is executed by the mobile apparatus in the first embodiment.

As shown on the left side of the middle stage of FIG. 4, for example, the user's finger has touched the window 16a displayed on the lower half portion of the display 12 (which is the first screen operation). Then, the user flicks (moves) the finger to the right (which is the second screen operation). This second screen operation by the user indicates a direction of the screen region in which the second window is opened with respect to the first window 16a.

The screen region setting unit 24 sets the screen region of a second window 16b corresponding to the second operation, according to the indicated direction, as shown on the left side of the lower stage of FIG. 4. This setting is performed in the orientation of the browser. That is, the screen region of the second window 16b is set in the orientation of display set by the browser, which is software for browsing content of data.

Referring to FIG. 4, for example, a photograph group of "A$^-$", "A", and "A$^+$" is linked to tabs. In this case, when the user flicks the finger to the right by the second screen operation, the window 16b of a tab on the right side of the currently displayed screen is displayed in the orientation of the browser. If the user flicks the finger to the left, a window 16c of a tab on the left side of the currently displayed screen is displayed in the orientation of the browser.

As an example of moving the finger up or down to set the screen region of the second window, an operation illustrated on the right side of the middle stage of FIG. 4 may be pointed out. In this case, the user's finger touches the window 16a illustrated on the lower half portion of the display 12 (which is the first screen operation). Then, he flicks the finger upwards (which is the second screen operation). This second screen operation indicates a direction of the screen region in which a second window 17*a* is opened with respect to the first window 16*a*.

As shown on the right side of the lower stage of FIG. 4, the screen region setting unit 24 sets the screen region of the second window 17*a* according to this direction. This setting is also performed in the orientation of the browser. In the example in FIG. 4, for example, the display region of the second window 17*a* is newly set above the window 16*a* in the orientation of the browser. Then, information of a link destination is displayed within the region.

By setting the second screen operation of the user to an up or down operation or a right or left operation in the direction of the screen region in which the second window is opened with respect to the first window, window region setting is intuitively associated with the screen operation of the user. Thus, it is easy for the user to learn the operation. High-speed screen operations and high-speed window display may be performed.

When the display operation (second screen operation by the user) is not recognized in step S310, the procedure proceeds to step S320. The screen region setting unit 24 automatically sets a predetermined (default) screen region as the screen region of the second window in the orientation of the browser. When the user has touched the first window with his finger and then separates the finger from the screen without performing any operation with the finger, it may be recognized that the second screen operation has not been performed. Then, information of a link destination may be displayed on the entire screen as the predetermined screen region, for example.

(Other Examples of Display)

In addition to the example mentioned above, combinations shown in FIG. 5 may be considered as examples of the selecting operation (first screen operation) and the display operation (second screen operation) according to the circumstances. To take an example, a first row of a table in FIG. 5 shows a case where the touch panel 14 is used as the device that detects a screen operation on the display performed by the user. A combination of a press operation as the selecting operation and flick, double tap, and release operations as the display operation is used. That is, assume that the user has touched a certain window as the first screen operation, flicks the finger to the left or right, and then releases the finger. Then, the certain window is selected as the first window. The display region of the second window for displaying information linked to a tab on the left-side or right-side of the first window is then displayed above the display region of the first window, in the orientation of the browser.

When a window different from the first window is opened, the user should press the finger and then double taps. When the first window is overwritten, the user should press and then release the finger. When the second window is opened in parallel with the first window, the user should press, flicks the finger upward or downward, and then release the finger.

A second row of the table in FIG. 5 shows a case where the touch panel 14 is used as the device that detects a screen operation on the display performed by the user. A combination of a long-press operation as the selecting operation and flick, double tap, and release operations as the display operation is used. That is, assume that the user long presses a certain window as the first screen operation, flicks the finger to the left or right, and then releases the finger. Then, the certain window is selected as the first window. The display region of the second window for displaying information linked to a tab on the left-side or right-side of the first window is then displayed in the display region of the first window, in the orientation of the browser.

When a window different from the first window is opened, the user should long press the finger and then double taps. When the first window is overwritten, the user should long press and then release the finger. When the second window is opened in parallel with the first window, the user should long press, flicks the finger upward or downward, and then release the finger.

A third row of the table in FIG. 5 shows an example where a touch pad or a mouse not shown is employed as the device that detects a screen operation on the display performed by the user. In this case, a combination of a press operation as the selecting operation and drag, double click, and release operations as the display operation is used. That is, assume that the user has pressed a certain window as the first screen operation and then drags the finger to the left or right and then releases the finger. Then, the certain window is selected as the first window. The display region of the second window for displaying information linked to a tab on the left-side or right-side of the first window is displayed in the display region of the first window, in the orientation of the browser.

When a window different from the first window is opened, the user should press the finger and then double clicks. When the first window is overwritten, the user should press and then release the finger. When the second window is opened in parallel with the first window, the user should press, drag the finger upward or downward, and then release the finger.

The above description was directed to examples of the combinations of the selecting operation and the display operation. The combinations of the selecting operation and the display operation are not limited to the above examples, and may be combinations of other operations.

As described above, according to the display apparatus mounted on the mobile apparatus 10 in this embodiment, the following processes are performed on the display 12 capable of displaying a plurality of windows so as to view and listen to contents, using the browser. First, the first window specified by the user is selected according to the first screen operation of the user on one of windows on the display 12. Next, according to the second screen operation of the user performed following the first screen operation, the screen region of the second window corresponding to the second screen operation is set with respect to the selected first window in the orientation of the browser.

With this arrangement, the user may carry out a method of selecting a window and then displaying the window, by a sequence of operations. This allows display of one or a plurality of windows of predetermined sizes at predetermined positions at high speed and according to a preference of the user, by the sequence of operations. When this display method is used for the mobile apparatus 10 having a small screen region in particular, encroachment of a Web page display region is reduced, and convenience is increased. Thus, this display method is effective.

Further, by a small number of intuitive operation steps, a window of a predetermined size may be displayed at a predetermined position according to a preference of the user. In this embodiment in particular, clicking in a left/right operation and clicking in an upper/lower direction are regarded as intuitive operations. Clicking in the left/right direction indicates a tab operation, while clicking in the upper/lower direction indicates display of a new screen in the upper/lower direction. In this case, clicking in an oblique direction is not intuitive. Thus, clicking in the oblique direction may be assigned to an operation of displaying a context menu. Both of the selecting operation and the display operation may be thereby performed without being interfered with a related-art touch panel operation.

Second Embodiment

Next, a mobile apparatus 10 according to a second embodiment will be described. A hardware configuration of the mobile apparatus 10 according to this embodiment is similar to the hardware configuration of the mobile apparatus 10 in the first embodiment. Thus, description of the hardware configuration of the mobile apparatus 10 in the second embodiment will be omitted.

[2-1 Functional Configuration of Mobile Apparatus]

Figure 6:
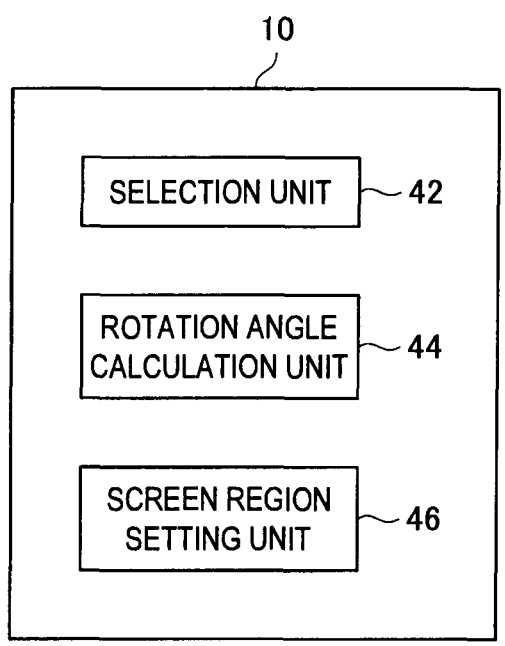
FIG. 6 is a diagram showing a functional configuration of the mobile apparatus in the second embodiment.

The mobile apparatus 10 according to the second embodiment has a functional configuration shown by functional blocks in FIG. 6. That is, the mobile apparatus 10 according to this embodiment includes a selection unit 42, a rotation angle calculation unit 44, and a screen region setting unit 46.

Figure 8:
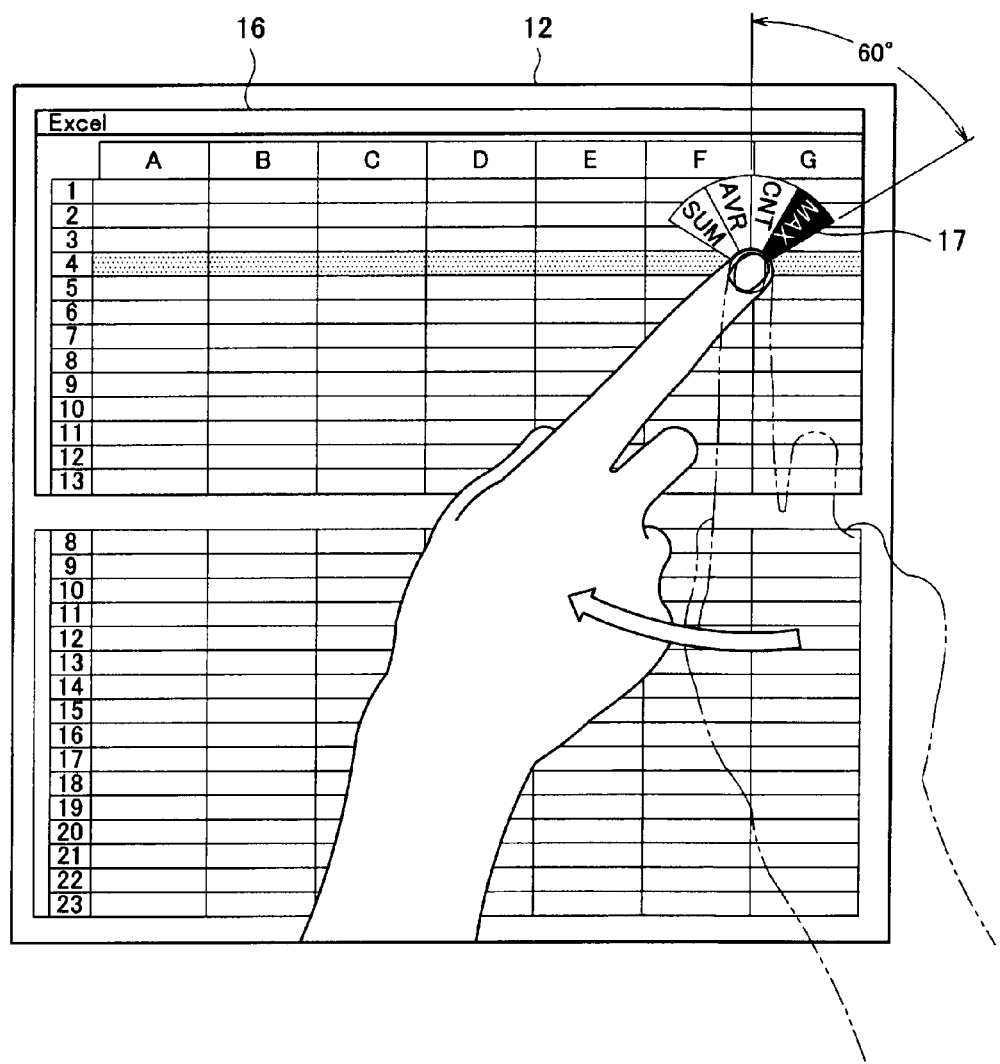
FIG. 8 is a diagram showing an example of window display that is executed by the mobile apparatus in the second embodiment.

The selection unit 42 selects a first window specified by a user according to a first screen operation of the user detected by the touch panel 14. Referring to FIG. 8, for example, when it is detected by the touch panel 14 that the user has touched an Excel screen displayed on the display 12 (which is a first screen operation), the selection unit 42 selects the touched Excel screen as a first window 16.

The rotation angle calculation unit 44 calculates a rotation angle relative to the selected first window 16 corresponding to a second screen operation, according to the second screen operation of the user following the first screen operation, detected by the touch panel. In FIG. 8, for example, a finger that has touched the first window 16 rotates clockwise from a vertical position of the finger by 60°. Accordingly, the rotation angle calculation unit 44 calculates the rotation angle of +60° relative to the first window, corresponding to the second screen operation.

The screen region setting unit 46 sets the display region of a second window 17 corresponding to the rotation angle calculated by the rotation angle calculation unit 44. In FIG. 8, for example, it is set in advance that a screen indicating a count (CNT) is displayed at a position rotated by +30° from the vertical position of the finger, a screen indicating a maximum value (MAX) is displayed at a position rotated by +60° from the vertical position of the finger, a screen indicating an average value (AVR) is displayed at a position rotated by −30° from the vertical position of the finger, and a screen indicating a sum value (SUM) is displayed at a position rotated by −60° from the vertical position of the finger. Accordingly, in this case, a circular arc-shaped menu screen shown in FIG. 8 is displayed. In this embodiment, the circular-arc menu screen is displayed in the screen region of the second window with respect to the selected first window, according to the second screen operation. The screen region of the second window corresponding to the second screen operation is set in the orientation of the browser.

In this embodiment as well, respective functions of the selection unit 42, rotation angle calculation unit 44, and screen region setting unit 46 are implemented by reading of each program by the CPU 32 from the RAM 34 and the non-volatile memory 36 and execution of the program by the CPU 32.

[2-2. Operation of Mobile Apparatus]

Figure 7:
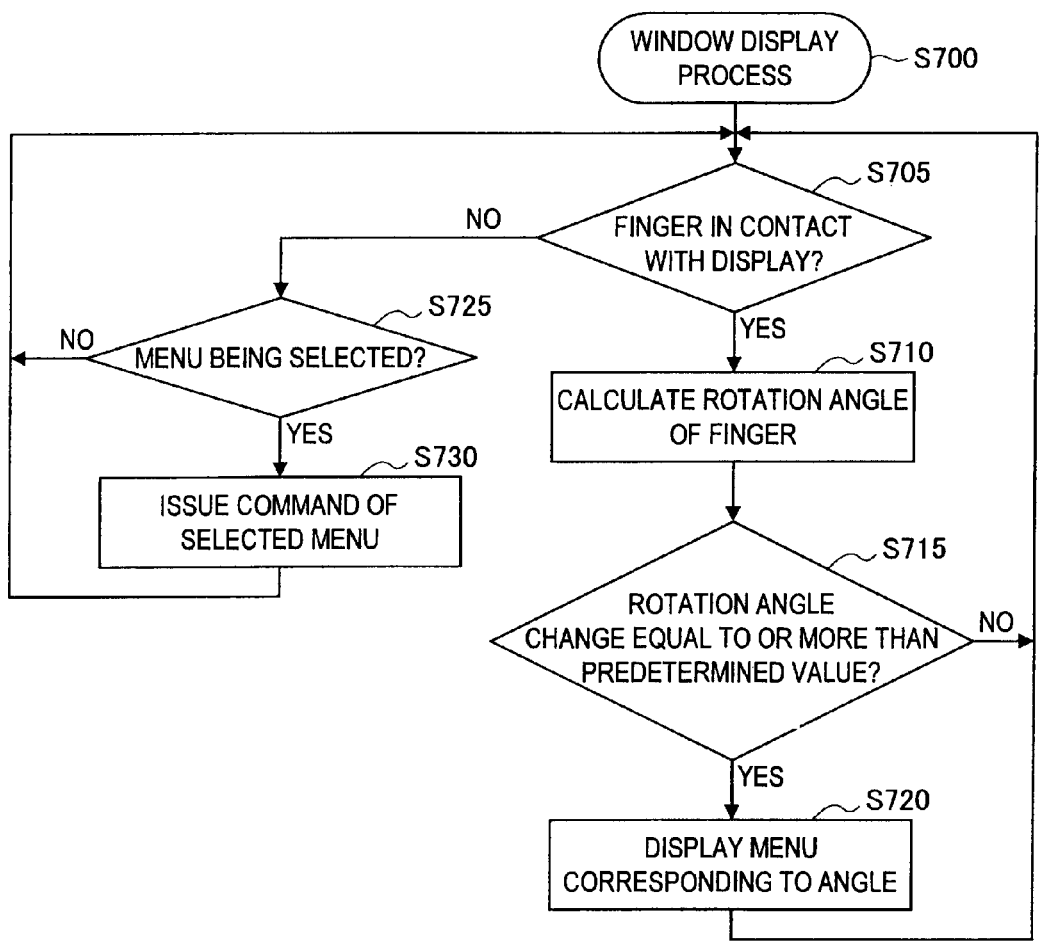
FIG. 7 is a flowchart showing a window display process that is executed by the mobile apparatus in the second embodiment.

Next, a window display process of the mobile apparatus 10 according to this embodiment will be described with reference to FIG. 7. FIG. 7 is a flowchart showing the window display process that is executed by the mobile apparatus 10 in this embodiment. Description will be given below by taking a Web browser capable of displaying a plurality of pages as an example. Operations that will be described below may also be regarded as operations of the display apparatus mounted on the mobile apparatus 10 in this embodiment.

When the window display process is started in step S700, the touch panel 14 detects whether or not a finger has touched the display 12 in step S705. When it is determined that the finger has touched the display 12, the selection unit 42 determines that the targeted first window has been selected. In the display 12 of the mobile apparatus 10 shown in FIG. 8, the window of the Excel screen is selected as the first window 16.

Next, when the user executes the second screen operation following the first screen operation, the second screen operation of the user is detected by the touch panel 14. Then, the rotation angle calculation unit 44 calculates an angle of rotation performed by the second screen operation relative to the first window 16 in step S710, according to the second screen operation of the user following the first screen operation, detected by the touch panel 14. As described above, the finger that has touched the first window 16 rotates clockwise by 60° from the vertical position of the finger in FIG. 8. Thus, the rotation angle corresponding to the second screen operation is calculated as +60°.

Next, the screen region setting unit 46 determines whether a change amount of the rotation angle is a predetermined value or more in step S715. When the rotation angle is the predetermined value or more, a menu screen corresponding to the rotation angle is displayed in the region of the second window 17 in step S720. Herein, the circular arc menu screen is displayed, centering on a point touched by the finger. Further, reversing display of a menu at the position rotated by the rotation angle of +60° is performed. After the menu has been displayed, the procedure is returned to step S705.

On the other hand, when it is determined in step S715 that the calculated rotation angle is less than the predetermined value, the menu screen is not displayed, and the procedure is returned to step S705. Referring to FIG. 8, for example, when the absolute value of the calculated rotation angle is less than 30°, the menu screen is not displayed.

When the touch panel 14 does not detect that the finger has touched the display 12 in step S705, the procedure proceeds to step S725. The selection unit 42 determines which one of menu screens of the second window 17 is being selected. Referring to FIG. 8, for example, it is seen that the finger has selected the menu screen indicating "Max". When the user releases the finger in this state, the procedure proceeds from step S725 to step S730. Then, the selection unit 42 issues the command of the selected menu. The procedure is then returned to step S705.

Referring to FIG. 8, a fourth row of the Excel table in FIG. 8 is selected by the issued command. The maximum value among respective items (A, B, C . . . ) is thereby selected.

As described above, according to the display apparatus mounted on the mobile apparatus 10 in this embodiment, the following processes are executed on the display 12 capable of displaying a plurality of windows so as to view and listen to contents using the browser. First, the first window specified by the user is selected, according to the first screen operation of the user on one of windows on the display 12. Next, the screen region of the second window corresponding to the second screen operation is set with respect to the selected first window in the orientation of the browser, according to the second screen operation of the user following the first screen operation. In this embodiment, the rotation angle of the finger is calculated in order to set the screen region of the second window.

With this arrangement, the user may carry out a method of selecting a window and then displaying the window, by a sequence of operations. This allows display of one or a plurality of windows of predetermined sizes at predetermined positions at high speed and according to a preference of the user, by the sequence of operations constituted from a small number of intuitive operation steps.

Third Embodiment

Next, a mobile apparatus 10 according to a third embodiment will be described. A hardware configuration of the mobile apparatus 10 according to this embodiment is similar to the hardware configuration of the mobile apparatus 10 in the first embodiment. Thus, description of the hardware configuration of the mobile apparatus 10 in the third embodiment will be omitted.

[3-1. Functional Configuration of Mobile Apparatus]

Figure 9:
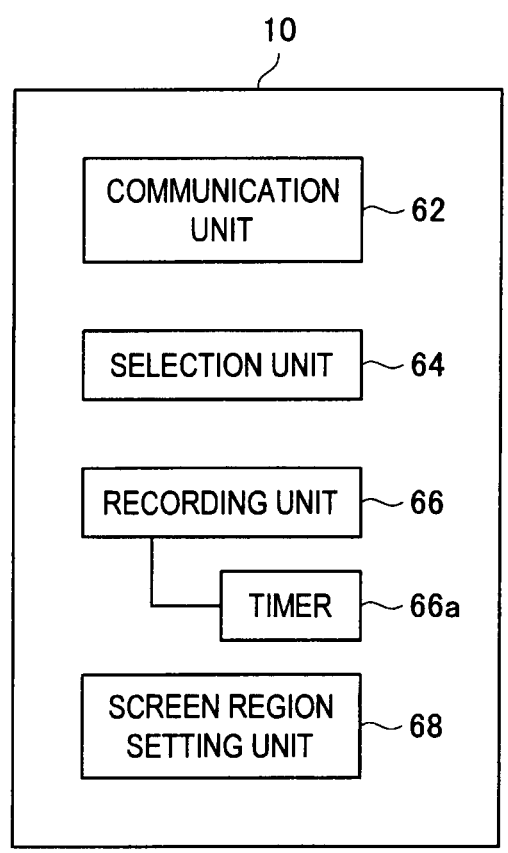
FIG. 9 is a diagram showing a functional configuration of the mobile apparatus in the third embodiment.

The mobile apparatus 10 according to the third embodiment includes a functional configuration shown by functional blocks illustrated in FIG. 9. That is, the mobile apparatus 10 according to this embodiment includes a communication unit 62, a selection unit 64, a recording unit 66, and a screen region setting unit 68.

Figure 11:
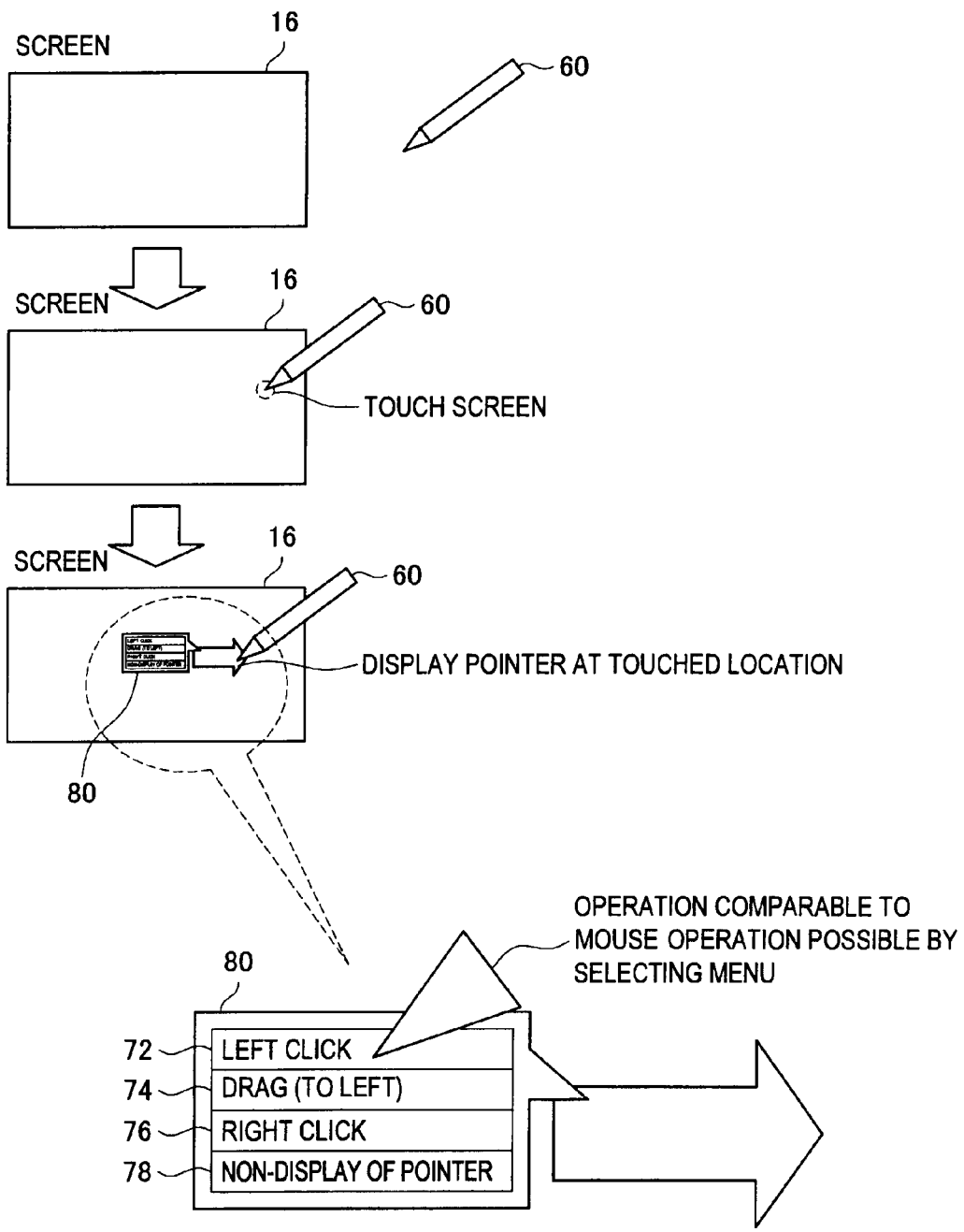
FIG. 11 includes diagrams showing examples of window display that is executed by the mobile apparatus in the third embodiment.

When an operational tool, an example of which being a touch pen 60, touches the screen as shown in FIG. 11, the communication unit 62 receives a data signal indicating a contact status (hereinafter referred to as contact status data) from the touch pen 60. In this embodiment, contact on the screen by the touch pen 60 is a first screen operation performed on the screen by a user. The touch pen 60 is an example of a device that detects a screen operation performed by the user on the display capable of displaying a plurality of windows using a browser. The communication unit 62 further receives a data signal indicating a non-contact status (hereinafter referred to as non-contact status data) from the touch pen 60.

The selection unit 64 selects a first window specified by the user according to the first screen operation of the user detected by the touch pen 60. Referring to FIG. 11, a first window 16 is selected by a touch on the screen by the touch pen 60. Herein, the display 12 and the like are omitted.

The recording unit 66 records a time at which the touch on the screen by the touch pen 60 has been received and a time at which separation of the touch pen 60 from the screen has been received, using a timer 66a.

The screen region setting unit 68 sets the screen region of a second window corresponding to a second screen operation, with respect to the first window 16, in the orientation of the browser, according to the operation of moving the touch pen 60 and then releasing the touch pen 60 following the first screen operation. Referring to FIG. 11, a pointer 80 is displayed on a touched portion of the touch pen 60. An example of menu items for the pointer 80 is displayed on a lower side of FIG. 11. The operation of moving and then releasing the touch pen 60 is the second screen operation by the user.

Figure 12:
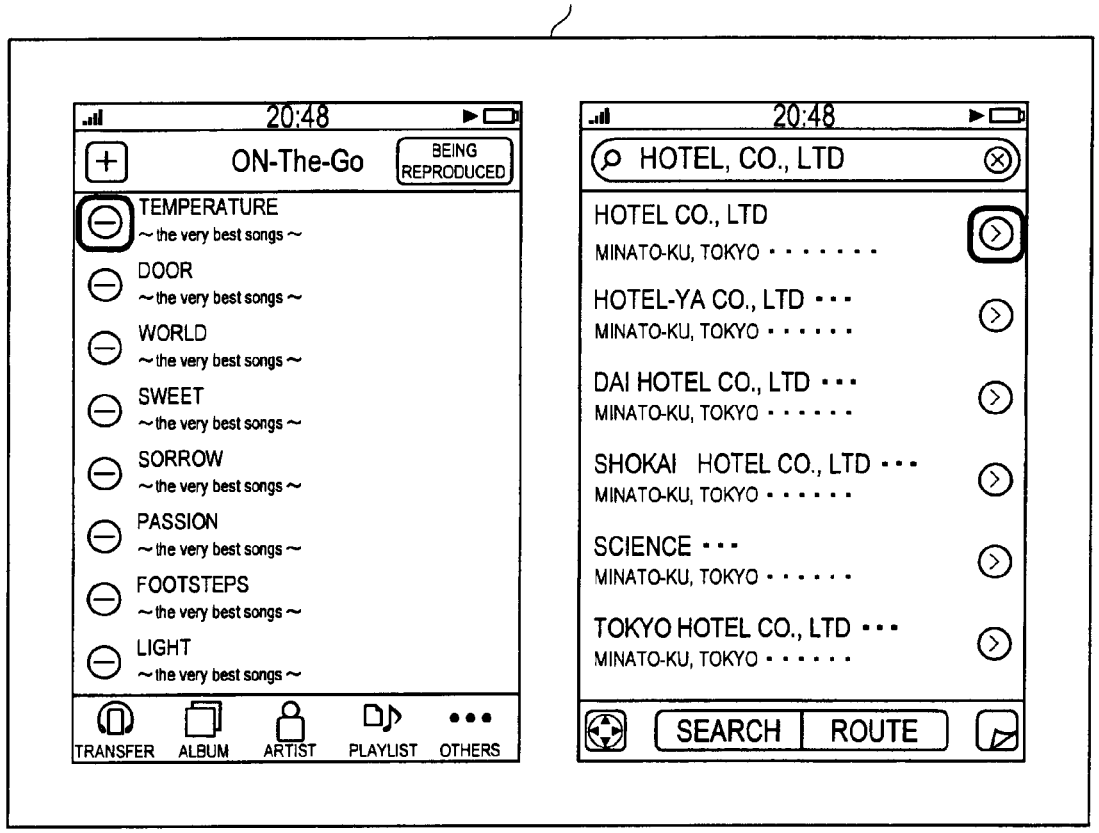
FIG. 12 is a diagram showing examples of window display that is executed by the mobile apparatus in the third embodiment.

The screen region setting unit 68 selects one of the items displayed for the pointer according to a period of time in which the touch pen 60 contacts the display 12, and executes a process linked to the selected item in advance. Referring to FIG. 11, the item corresponding to left click 72 is selected from the screen of the menu items, according to the period of time in which the touch pen 60 contacts the display 12, and the process linked to the selected item corresponding to the left click is executed. FIG. 12 shows examples of process results.

In this embodiment as well, respective functions of the communication unit 62, selection unit 64, recording unit 66, and screen region setting unit 66 are implemented by reading of each program by the CPU 32 from the RAM 34 and the non-volatile memory 36 and execution of the program by the CPU 32.

[3-2. Operation of Mobile Apparatus]

Figure 10:
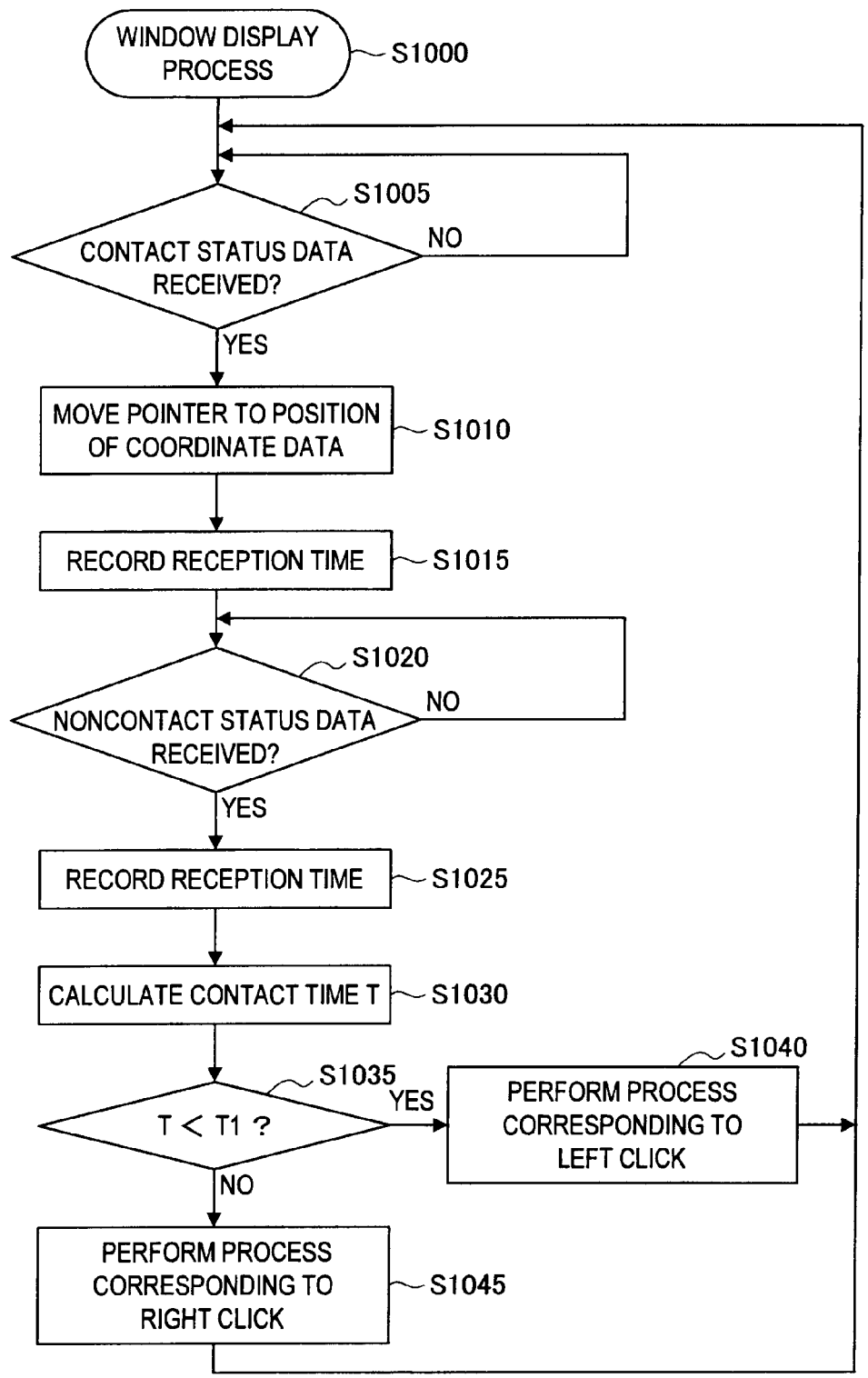
FIG. 10 is a flowchart showing a window display process that is executed by the mobile apparatus in the third embodiment.

Next, a window display process of the mobile apparatus 10 in this embodiment will be described with reference to FIG. 10. FIG. 10 is a flowchart showing the window display process that is executed by the mobile apparatus 10 according to this embodiment. Description will be given below by taking a Web browser capable of displaying a plurality of pages as an example. Operations that will be described below may also be regarded as operations of the display apparatus mounted on the mobile apparatus 10 in this embodiment.

When the window display process is started in step S1000, it is detected whether or not the touch pen 60 has touched the display 12 in step S1005. Actually, the process in step S1005 is repetitively executed until the communication unit 62 receives the contact status data from the touch pen 60. When the communication unit 62 receives the contact status data, the procedure proceeds to step S1010. Herein, upon receipt of the contact status data by the communication unit 62, a location touched by the touch pen 60 is selected as the first window 16 specified by the user.

In step S1010, the screen region setting unit 68 moves the pointer 80 to the position of coordinate data on the touched location. Next, in step S1015, the recording unit 66 records in the RAM 34 a time at which the contact status data has been received, and a process in step S1020 is repetitively executed until the noncontact status data is received from the touch pen 60.

When the noncontact status data is received from the touch pen 60, the recording unit 66 records in the RAM 34 the time at which the noncontact status data has been received, in step S1025. Next, in step S1030, the screen region setting unit 68 calculates as a contact time T a difference between the time at which the contact status data has been received and the time at which the noncontact status data has been received, both of which have been recorded in the RAM.

Next, the screen region setting unit 68 determines whether or not the contact time T is smaller than a predetermined threshold value T1, in step S1035. When the contact time T is smaller than the predetermined threshold value T1, the procedure proceeds to step S1040, and executes the process linked to the menu item corresponding to the left click 72 shown in FIG. 11. As the process corresponding to the left click, for example, there may be pointed out an example where a second window 17 is opened at a predetermined position of the display 12, and a reproduction screen that displays a predetermined group of music pieces is shown on the left side of the second window 17.

When the screen region setting unit 68 determines that the contact time T is equal to or higher than the predetermined threshold value T1 in step S1035, the procedure proceeds to step S1045. Then, the screen region setting unit 68 executes a process linked the menu item corresponding to right click 76 shown in FIG. 11. As the process corresponding to the right click, for example, there may be pointed out an example where a screen indicating retrieval results of hotels shown on the right side of FIG. 12 is displayed on a right half portion of the second window 17.

The screen region setting unit 68 may select the menu item corresponding to drag (to the left) 74 or pointer non-display 78 from the displayed menu items for the pointer 80 based on the contact time T, and may execute those processes.

As described above, according to the display apparatus mounted on the mobile apparatus 10 in this embodiment, the following processes are executed on the display 12 capable of displaying a plurality of windows so as to view and listen to contents using the browser. First, the first window 16 specified by the user is selected, according to the first screen operation of the user on one of the windows on the display 12. Next, the screen region of the second window 17 corresponding to the second screen operation is set with respect to the selected first window, according to the second screen operation of the user following the first screen operation. In this embodiment, calculation of the contact time T for selection of a menu item is performed so as to set the screen region of the second window 17.

With this arrangement, the user may carry out a method of selecting a window and then displaying the window by a sequence of operations. This allows display of a plurality of windows of predetermined sizes at predetermined positions at high speed and according to a preference of the user, by the sequence of intuitive operations constituted from a small number of intuitive operation steps. Further, according to this embodiment, by selecting an arbitrary menu item by the above-mentioned operations, an operation comparable to that of a mouse may be performed.

Variation Example

Figure 13:
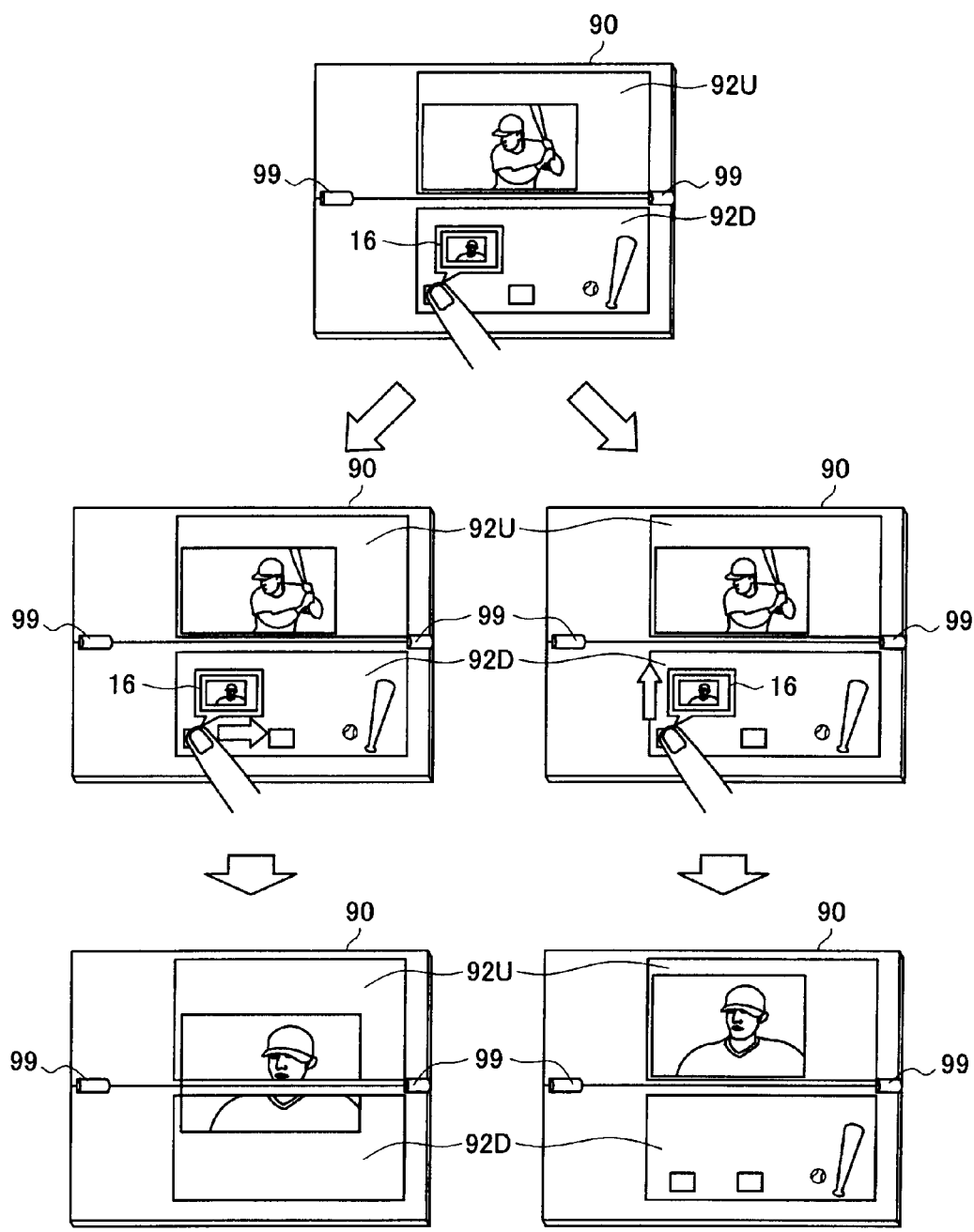
FIG. 13 includes diagrams showing an example of a mobile apparatus in a variation example.

Finally, an electronic apparatus 90 in FIG. 13 will be briefly described as a variation example of a portable-type apparatus that includes the display apparatus in each embodiment described above. The electronic apparatus 90 includes two screens of an upper display 92U and a lower display 92D. A touch panel not shown is mounted on each of the upper display 92U and the lower display 92D. The electronic apparatus 90 is foldable by a hinge mechanism 99 in its center, which makes it convenient to carry the electronic apparatus 90.

According to the display apparatus mounted on the electronic apparatus 90 in this variation example as well, one or a plurality of windows of predetermined sizes may be displayed at predetermined positions by a sequence of operations constituted from a small number of intuitive operation steps, at high speed and according to a preference of a user.

The upper display 92U and the lower display 92D in the display apparatus mounted on the electronic apparatus 90 in this variation example may display a plurality of windows so as to view and listen to contents using a browser. When the user touches a finger on the lower display 92D (which is a first screen operation of the user), a first window 16 specified by the user is selected, according to this first screen operation. Herein, enlarged display of the screen of the first window 16 is made by a pop-up function.

Next, the screen region of a second window 17 corresponding to a second screen operation is set with respect to the selected first window 16, according to the second screen operation of the user following the first screen operation.

In the electronic apparatus 90 in FIG. 13, for example, right flick is executed as the second screen operation of the user following the first screen operation, as shown on the left side of the middle stage of FIG. 13. In this case, the currently-displayed screen of a link destination is displayed using entire surfaces of the upper display 92U and the lower display 92D, as shown on the left side of the lower stage of FIG. 13.

On the other hand, when upper flick is executed as the second screen operation of the user following the first screen operation, as shown on the right side of the middle stage of FIG. 13, the currently-displayed screen of the link destination is displayed on the upper display 92U, as shown on the right side of the lower stage of FIG. 13.

With this arrangement as well, the user may carry out a method of selecting a window and then displaying the window by a sequence of operations. This allows display of one or a plurality of windows of predetermined sizes at predetermined positions at high speed and according to a preference of the user, by the sequence of operations constituted from a small number of intuitive operation steps.

In the embodiments described above, operations of the respective units are associated with one another and may be replaced with a sequence of operations and a sequence of processes, with the mutual association being taken into consideration. The embodiments of the display apparatus may be thereby regarded as an embodiment of a display method and an embodiment of a program for causing a computer to implement a function of the display apparatus.

With this arrangement, there may be provided a display method including the steps of:

detecting, by a device such as a touch panel or a touch pen, a screen operation on a display screen performed by a user, the display screen being capable of displaying a plurality of windows using a browser;

selecting a first window specified by the user, according to a first screen operation of the user detected by the device; and setting a screen region of a second window with respect to the selected first window in an orientation of the browser, according to a second screen operation of the user following the first screen operation, detected by the device, the screen region of the second window corresponding to the second screen operation.

With this arrangement, there may be provided a program that causes a computer to execute the processes of:

detecting, by a device, a screen operation on a display screen performed by a user, the display screen being capable of displaying a plurality of windows using a browser;

selecting a first window specified by the user, according to a first screen operation of the user detected by the device; and setting a screen region of a second window with respect to the selected first window in an orientation of the browser, according to a second screen operation of the user following the first screen operation, detected by the device, the screen region of the second window corresponding to the second screen operation.

The steps described in the flowcharts in this specification include not only processes that are executed in time series according to the order of description, but also processes that are executed in parallel or individually even if the processes are not necessarily processed in time series. Even in the steps that are processed in time series, the order of the steps may be changed as necessary, according to the circumstances.

It should be understood by those skilled in the art that various modifications, combinations, sub-combinations and alterations may occur depending on design requirements and other factors insofar as they are within the scope of the appended claims or the equivalents thereof.

Even if the display 12 uses a vertical layout or a horizontal layout, for example, the screen region of the second window corresponding to the second screen operation is set in the orientation of the browser.

The touch panel used in the present invention may be an electrostatic capacity type, or an optical type. Further, as the contact sensor of the device that detects the screen operation of the user, a touch sensor, a touch panel, a touch screen, or a touch pad including a matrix switch, a resistive film switch, or a surface elastic wave switch may be pointed out.

The present application contains subject matter related to that disclosed in Japanese Priority Patent Application JP 2009-167910 filed in the Japan Patent Office on Jul. 16, 2009, the entire content of which is hereby incorporated by reference.

What is claimed is:

1. A display apparatus comprising:
   a display screen capable of displaying a plurality of windows using a browser;
   a device configured to detect one or more screen operations performed by a user;
   a selection unit configured to select a first one of the displayed windows according to a first one of the screen operations; and
   a screen region setting unit configured to:
      obtain information indicative of a type of operation associated with a second one of the detected screen operations; and
      establish at least one of a position or a size of a second window with respect to the selected first window, according to the type of the second screen operation,
   wherein:
      the position of the second window corresponds to a position at which the second window is opened with respect to the first window; and
      the screen region setting unit is further configured to:
         obtain information indicative of a direction associated with a displacement between the first and second screen operations: and
         establish the position of the second window according to the direction information.

2. The display apparatus according to claim 1, wherein the screen region setting unit is further configured to automatically establish a predetermined screen region for the second window, when the device fails to detect the second screen operation of the user.

3. The display apparatus according to claim 1, wherein the display apparatus is mounted on a portable-type terminal.

4. The display apparatus according to claim 1, wherein:
   the second screen operation corresponds to a rotation of an operational tool relative to the selected first window:
   the display apparatus further comprises a rotation angle calculation unit configured to calculate a rotation angle corresponding to the rotation of the operational tool, the rotation angle being relative to the selected first window; and
   the screen region setting unit is further configured to establish a display region of the second window according to the rotation angle calculated by the rotation angle calculation unit.

5. The display apparatus according to claim 1, wherein the screen region setting unit is further configured to establish a display region of the second window, according to a period of time associated with the first screen operation.

6. A display method, comprising:
   detecting, by a device, one or more screen operations performed by a user;
   selecting a first one of a plurality of windows displayed by a display screen, according to a first one of the screen operations by the device, the display screen being configured to display the plurality of windows using a browser;
   obtaining information indicative of a type of operation associated with a second one of the screen operations; and
   establishing at least one of a size or a position of a second window with respect to the selected first window, according to the type of the second screen operation, the position of the second window corresponding to a position at which the second window is opened with respect to the first window and the establishing comprising:
      obtaining information indicative of a direction associated with a displacement between the first and second screen operations; and
      establishing the position of the second window according to the direction information.

7. A tangible, non-transitory computer-readable medium storing instructions that, when executed by at least one processor, cause the at least one processor to perform a method comprising:
   detecting, by a device, one or more screen operations performed by a user;
   selecting a first one of a plurality of windows displayed by a display screen, according to a first one of the screen operations detected by the device, the display screen being configured to display the plurality of windows using a browser;
   obtaining information indicative of a type of operation associated with a second one of the screen operations; and
   establishing at least one of a size or a position of a second window with respect to the selected first window, according to the type of the second screen operation, the position of the second window corresponding to a position at which the second window is opened with respect to the first window and the establishing comprising:
      obtaining information indicative of direction associated with a displacement between the first and second screen operations; and
      establishing the position of the second window according to the direction information.

8. The display apparatus of claim 1, wherein the screen region setting unit is further configured to generate an instruction to display the second window in accordance with the established size or position.

9. The display apparatus of claim 1, wherein the display screen is further configured to display at least the second window, in accordance with the generated instruction.

10. The display apparatus of claim 1, wherein:
   the device configured to detect corresponds to a sensor unit coupled to the display screen; and
   the sensor unit is configured to detect a position associated with a contact between a portion of an operational tool and a surface of the display screen.

11. The display apparatus of claim 10, wherein the sensor unit is further configured to detect a first contact position associated with the first screen operation and a second contact position associated with the second screen operation.

12. The display apparatus of claim 11, wherein the screen region setting unit is further configured to:
   determine a displacement between the first and second contact positions; and
   establish at least one of the position or size of the second window in accordance with the determined displacement.

13. The display apparatus of claim 12, wherein the screen region setting unit is further configured to:
   determine a direction of the displacement between the first and second contact positions; and
   establish at least one of the position or size of the second window in accordance with the determined direction of displacement.

14. The display apparatus of claim 12, wherein:

the sensor unit is further configured to detect, for the first screen operation, a time associated with the contact between the operational tool and the display screen surface; and the screen region setting unit is further configured to establish a display region of the second window, based on the contact time.

15. The display apparatus of claim 1, wherein the second window displays content associated with the content displayed within the first window.

16. The display apparatus of claim 1, wherein the second window comprises a menu, the menu enabling the user to select one or more functions corresponding to content within the first window.

17. The method of claim 6, further comprising establishing a predetermined screen region for the second window, when the device fails to detect the second screen operation of the user.

18. The method of claim 6, wherein:

the position of the second window corresponds to a position at which the second window is opened with respect to the first window; and the method further comprises:

obtaining information indicative of a direction associated with a displacement between the first and second screen operations; and establishing the position of second window according to the direction information.

19. The method of claim 6, wherein:

the second screen operation corresponds to a rotation of an operational tool relative to the selected first window; and the method further comprises;

calculating a rotation angle corresponding to the rotation of the operational tool, the rotation angle being relative to the selected first window; and establishing a display region, of the second window according to the rotation angle calculated by the rotation angle calculation unit.

* * * * *